US012777459B2

(12) United States Patent
Kaikkonen et al.

(10) Patent No.: US 12,777,459 B2

(45) Date of Patent: Oct. 27, 2026

(54) MECHANISM FOR PAGING ENHANCEMENT

(71) Applicant: NOKIA TECHNOLOGIES OY, Espoo (FI)

(72) Inventors: Jorma Johannes Kaikkonen, Oulu (FI); Mads Lauridsen, Gistrup (DK); Daniela Laselva, Klarup (DK); Chunli Wu, Beijing (CN); Timo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 392 days.

(21) Appl. No.: 18/271,775

(22) PCT Filed: Jan. 13, 2021

(86) PCT No.: PCT/CN2021/071528

§ 371 (c)(1),
(2) Date: Jul. 11, 2023

(87) PCT Pub. No.: WO2022/151059

PCT Pub. Date: Jul. 21, 2022

(65) Prior Publication Data

US 2024/0073862 A1 Feb. 29, 2024

(51) Int. Cl.
*H04W 68/02* (2009.01)
*H04W 64/00* (2009.01)

(52) U.S. Cl.
CPC ......... *H04W 68/02* (2013.01); *H04W 64/006* (2013.01)

(58) Field of Classification Search
None
See application file for complete search history.

(56) References Cited

U.S. PATENT DOCUMENTS

| | | | |
|---|---|---|---|
| 8,897,818 | B2 | 11/2014 | Weng et al. |
| 9,210,720 | B2 | 12/2015 | Abraham et al. |
| 9,907,051 | B2 | 2/2018 | Wang et al. |
| 10,448,360 | B2 | 10/2019 | Tenny et al. |
| 10,904,859 | B2 | 1/2021 | Agiwal et al. |

(Continued)

FOREIGN PATENT DOCUMENTS

| | | |
|---|---|---|
| CN | 109548081 A | 3/2019 |
| CN | 107018496 B | 11/2019 |

(Continued)

OTHER PUBLICATIONS

"3rd Generation Partnership Project; Technical Specification Group Radio Access Network; NR; Multiplexing and channel coding (Release 16)", 3GPP TS 38.212 v16.3.0, (Sep. 2020), 152 pages.

(Continued)

*Primary Examiner* — Frantz Bataille

(74) *Attorney, Agent, or Firm* — ALSTON & BIRD LLP

(57) ABSTRACT

According to embodiments of the present disclosure, a first device receives a configuration of a paging indication from a second device. The configuration indicates how to monitor the paging indication and mapping between the paging indication and a set of paging occasions. The first device monitors a paging message in a paging occasion associated with the first device. In this way, it can reduce latency and save power at the first device. Further, it also saves signaling for paging.

13 Claims, 8 Drawing Sheets

(56) References Cited

U.S. PATENT DOCUMENTS

| | | | |
|---|---|---|---|
| 11,229,009 B2 | 1/2022 | Charbit et al. | |
| 11,290,981 B2 | 3/2022 | Berggren et al. | |
| 12,096,396 B2 | 9/2024 | Xu et al. | |
| 2004/0192257 A1 | 9/2004 | Stenberg | |
| 2019/0223145 A1 | 7/2019 | Jung et al. | |
| 2019/0394749 A1* | 12/2019 | Islam | H04B 7/088 |
| 2020/0025290 A1 | 1/2020 | Bai | |
| 2020/0205122 A1 | 6/2020 | Liu | |
| 2020/0404617 A1* | 12/2020 | Murray | H04W 52/0229 |
| 2022/0110090 A1 | 4/2022 | Wang et al. | |

FOREIGN PATENT DOCUMENTS

| | | |
|---|---|---|
| CN | 112118615 A | 12/2020 |
| EP | 2453710 B1 | 10/2013 |
| EP | 4193699 A1 | 6/2023 |
| EP | 4255058 A1 | 10/2023 |
| JP | 2020-507980 A | 3/2020 |
| WO | 2018/144873 A1 | 8/2018 |
| WO | 2019/190229 A1 | 10/2019 |
| WO | 2022/029039 A1 | 2/2022 |
| WO | 2022/030911 A1 | 2/2022 |

OTHER PUBLICATIONS

"3rd Generation Partnership Project; Technical Specification Group Radio Access Network; NR; Physical layer procedures for control (Release 16)", 3GPP TS 38.213 v16.3.0, (Sep. 2020), 179 pages.

Convida Wireless, "Paging Enhancements for UE Power Savings", 3GPP TSG-RAN WG2 Meeting #112 electronic, R2-2010079, (Nov. 2-13, 2020), 3 pages.

Huawei et al., "Paging enhancement(s) for UE power saving in IDLE/inactive mode", 3GPP TSG RAN WG1 Meeting #103-e, R1-2007600, (Oct. 26-Nov. 13, 2020), 15 pages.

Samsung Electronics, "Extended PO for Paging in NR-U", 3GPP TSG-RAN2 105bis, R2-1903107, (Apr. 8-12, 2019), 3 pages.

Vivo, "Discussion on paging grouping", 3GPP TSG RAN WG1 #102-e, R1-2005390, (Aug. 17-28, 2020), 5 pages.

Vivo, "Discussion on paging grouping", 3GPP TSG RAN WG1 #103-e, R1-2007675, (Oct. 26-Nov. 13, 2020), 9 pages.

Office Action for Mexican Application No. MX/a/2023/008332 dated Feb. 24, 2026, 16 pages.

"Revised WID UE Power Saving Enhancements for NR", 3GPP TSG RAN meeting #88e, RP-200938, MediaTek Inc., Agenda item: 9.10.7, Jun. 29-Jul. 3, 2020, 5 pages.

"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304 V16.2.0, Sep. 2020, pp. 1-64.

"3rd Generation Partnership Project; Technical Specification Group Radio Access Network; NR; User Equipment (UE) procedures in Idle mode and RRC Inactive state (Release 16)", 3GPP TS 38.304 V16.2.0, Sep. 2020, pp. 1-39.

"3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.

"Evaluation methodology and paging enhancements for idle/inactive mode UE power saving", 3GPP TSG RAN WG1 #102-e, R1-2005615, MediaTek Inc., Agenda item: 8.7.1.1, Aug. 17-28, 2020, 11 pages.

IEEE 802.11, Wikipedia, Retrieved on Jun. 19, 2025, Webpage available at : https://en.wikipedia.org/wiki/IEEE 802.11.

Notice of Allowance received for corresponding Japanese Patent Application No. 2023-542595, dated Jul. 23, 2024, 2 pages of Notice of Allowance and No. page of translation available.

"Paging enhancements for UE power saving", 3GPP TSG RAN WG1 #103-e, R1-2008689, InterDigital, Inc., Agenda item: 8.7.1.1, Oct. 26-Nov. 13, 2020, 10 pages.

"Details on paging sub-grouping indication and determination"; 3GPP TSG-RAN WG2 Meeting #113 Electronic, R2-2101148, Nokia, Agenda item: 8.9.2, Jan. 25-Feb. 5, 2021, 2 pages.

Office action received for corresponding Canadian Patent Application No. 3204846, dated Oct. 22, 2024, 3 pages.

International Search Report and Written Opinion dated Jul. 6, 2021 corresponding to International Patent Application No. PCT/CN2021/071528.

Shi, Minghui, "Office Action", Canadian Patent Application 3,204,846, mailed Jun. 27, 2025, 4 pages.

Office Action for Canadian Application No. 3,204,846 dated Apr. 28, 2026, 4 pages.

* cited by examiner

MECHANISM FOR PAGING ENHANCEMENT

FIELD

Embodiments of the present disclosure generally relate to the field of telecommunication and in particular, to methods, devices, apparatuses and computer readable storage medium for paging enhancement.

BACKGROUND

Discontinuous reception (DRX) is a method that is employed in various wireless technologies to allow a terminal device to turn its receiver off during periods of inactivity. DRX can be employed in both RRC idle mode and RRC connected mode. In communication systems, the terminal device is configured to use DRX to reduce power consumption and the terminal devices are expected to monitor one paging occasion (PO) per DRX cycle. In RRC idle mode, the DRX cycle is based on the paging cycle, as the terminal device expects to only receive paging messages. In RRC connected mode, the terminal device needs to monitor physical downlink control channel (PDCCH) search space for possible indication of incoming traffic. Therefore, how to monitor the paging occasion properly is a very important aspect.

SUMMARY

In general, example embodiments of the present disclosure provide a solution for paging enhancement.

In a first aspect, there is provided a first device. The first device comprises at least one processor; and at least one memory including computer program codes; the at least one memory and the computer program codes are configured to, with the at least one processor, cause the first device to receive from a second device a configuration of a paging indication, the configuration indicating: location information for monitoring the paging indication, and mapping information between the paging indication and a set of paging occasions in at least one paging frame. The first device is further caused to receive the paging indication from the second device based on the location information; means for determining, based on the mapping information, a paging occasion which is associated with the first device from the set of paging occasions. The first device is also caused to determine a paging occasion which is associated with the first device. The first device is also caused to monitor a paging message in the determined paging occasion associated with the first device.

In a second aspect, there is provided a second device. The second device comprises at least one processor; and at least one memory including computer program codes; the at least one memory and the computer program codes are configured to, with the at least one processor, cause the second device to transmit to a first device a configuration of a paging indication, the configuration indicating location information for monitoring the paging indication, and mapping information between the paging indication and a set of paging occasions in at least one paging frame. The second device is also caused to transmit the paging indication to the first device based on the location information. The second device is further caused to transmit, to the first device, a paging message in a paging occasion associated with the first device in the set of paging occasions based on the paging indication.

In a third aspect, there is provided a method. The method comprises receiving, at a first device and from a second device, a configuration of a paging indication, the configuration indicating: location information for monitoring the paging indication, and mapping information between the paging indication and a set of paging occasions in at least one paging frame; receiving the paging indication from the second device based on the location information; determining, based on the mapping information, a paging occasion which is associated with the first device from the set of paging occasions; and monitoring a paging message in the determined paging occasion associated with the first device.

In a fourth aspect, there is provided a method. The method comprises transmitting, at a second device and to a first device, a configuration of a paging indication, the configuration indicating location information for monitoring the paging indication, and mapping information between the paging indication and a set of paging occasions in at least one paging frame; transmitting the paging indication to the first device based on the location information; and transmitting, to the first device, a paging message in a paging occasion associated with the first device in the set of paging occasions based on the paging indication.

In a fifth aspect, there is provided an apparatus. The apparatus comprise means for receiving, at a first device and from a second device, a configuration of a paging indication, the configuration indicating: location information for monitoring the paging indication, and mapping information between the paging indication and a set of paging occasions in at least one paging frame; means for receiving the paging indication from the second device based on the location information; means for determining a paging occasion which is associated with the first device; and means for monitoring a paging message in the determined paging occasion associated with the first device.

In a sixth aspect, there is provided an apparatus. The apparatus comprises means for transmitting, at a second device and to a first device, a configuration of a paging indication, the configuration indicating location information for monitoring the paging indication, and mapping information between the paging indication and a set of paging occasions in at least one paging frame; means for transmitting the paging indication to the first device based on the location information; and means for transmitting, to the first device, a paging message in a paging occasion associated with the first device in the set of paging occasions based on the paging indication.

In a seventh aspect, there is provided a computer readable medium. The computer readable medium comprises program instructions for causing an apparatus to perform at least the method according to any one of the above third and fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
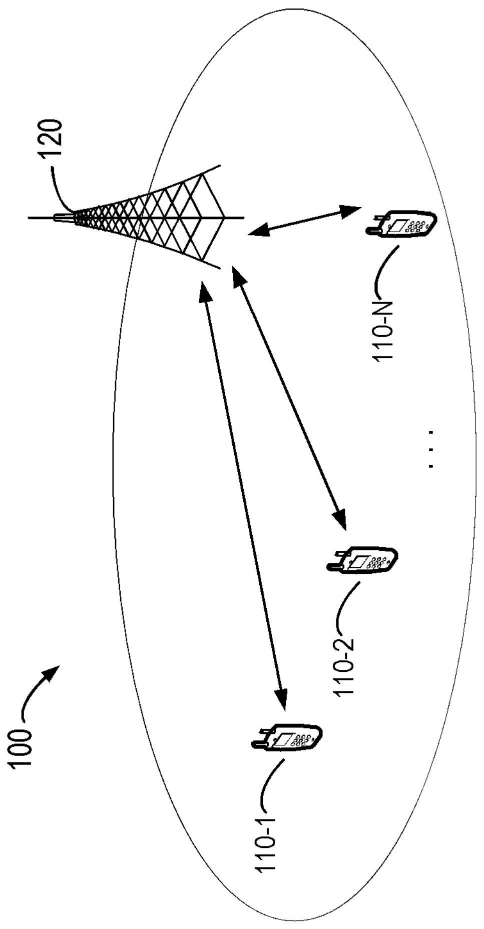
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. The term "terminal device" refers to any end device that may be capable of wireless communication. In the following description, the terms "terminal device", "terminal", "user equipment" and "UE" may be used interchangeably.

As mentioned above, how to monitor paging messages properly is a very important. Study on UE power saving has been conducted by 3GPP. While in RRC Inactive/Idle, the UE has to monitor regularly for paging. This is done according to the network defined paging cycles (i.e. the Inactive-/Idle DRX cycle of the UE in RRC inactive/idle). Rules are pre-known at UE and network allows to determine the right paging occasions (PO) based on a UE identifier. The UE identifier for paging is known within the 5G-radio access network (RAN), and thus the POs can be determined in the 5G-RAN to enable core network (CN)-level paging within the Tracking Area and RAN-level paging within the RAN Notification Area (RNA). The latter one is specific to RRC Inactive UE only. However, before monitoring for paging, the UE has to perform tracking and time-frequency downlink synchronization with the serving cell, currently based on synchronization signal blocks (SSBs). This means that a UE may need to wake up well before its paging occasion (PO) and read a certain number of SSB bursts prior to PO to ensure time-frequency synchronization with the network in order to be ready to decode eventually the paging record in PDSCH. The number of required SSBs varies with the UE SINR and may be based on the UE vendor. The expectation is that up to 3 SSB bursts may be needed for low SINR UEs at least for certain UE vendors/models, whereas UEs in good SINR may need only a single SSB burst. Obviously the earlier the UE wakes up prior to a PO, the more power it consumes. Moreover, most of the times, no paging is present for the UE, so such preparation is unnecessary for the majority of the paging cycles.

An additional cause of unnecessary power consumption for paging is due to the fact that typically many UEs share the same PO (i.e. read the same Paging DCI) and "false-paging alarm" rate can be high, since most UEs in the PO do not find their UE identifier for paging in the paging record.

Several proposals have been discussed to tackle the issues above. Main mechanisms are Early Paging Indication (EPI), sometimes also be called as Paging Early indication (PEI), which enables to indicate the presence of paging prior to the PO, and UE subgrouping with the PO, which enables to indicate the presence of paging for a specific UE subgroup in a PO.

The DCI-based Early Paging Indication (EPI) should be provided to UEs in RRC Inactive/idle mode in a beam sweeping manner (i.e. it's to be sent via all the transmitting beams indicated in the System Information) and with a high aggregation level (AL), e.g. AL 16, to ensure its successful reception at the cell edge. This may be costly in PDCCH capacity and challenging particularly in scenarios/configurations where the PDCCH capacity may be scares.

Moreover, if the paging load increases in a cell and it is not possible to page all UEs in the same PO corresponding to a paging frame (PF) of the paging cycle, multiple POs can be configured in each PF. Then the UEs may be distributed to these POs evenly based on their UE identifiers. The number of POs per PF is configurable via system information based on the parameter ns in NR, where ns is the number of paging occasions per paging frame.

Currently, the EPI details are not specified and it has not been discussed in 3GPP whether the EPI is PO-specific or not. In the case of PO-specific EPI, the network would have to send as many EPI signals as there are POs in a PF, thus increasing the PDCCH capacity requirement for EPI.

A technology named "Wake-Up Signal (WUS)" has been proposed, which dynamically control the UE's PDCCH monitoring behavior depending on the data traffic. The power saving signal can indicate whether the UE skips the subsequent monitoring occasions within the DRX on duration or not. By this way, the UE will wake up to monitor PDCCH only when there is data targeted for the UE.

In order to solve at least a part of the problems, a solution for paging indication has been proposed. According to embodiments of the present disclosure, a first device receives a configuration of a paging indication from a second device. The configuration indicates how to monitor the paging indication and mapping between the paging indication and a set of paging occasions. The first device monitors a paging message in a paging occasion associated with the first device. In this way, it can reduce latency and save power at the first device. Further, it also saves signaling for paging.

FIG. 1 illustrates a schematic diagram of a communication environment 100 in which embodiments of the present disclosure can be implemented. The communication environment 100, which is a part of a communication network, further comprises a device 110-1, a device 110-2, . . . , a device 110-N, which can be collectively referred to as "first device(s) 110." The communication environment 100 comprises a second device 120.

The communication environment 100 may comprise any suitable number of devices and cells. In the communication environment 100, the first device 110 and the second device 120 can communicate data and control information to each other. In the case that the first device 110 is the terminal device and the second device 120 is the network device, a link from the second device 120 to the first device 110 is referred to as a downlink (DL), while a link from the first device 110 to the second device 120 is referred to as an uplink (UL). The second device 120 and the first device 110 are interchangeable.

It is to be understood that the number of first devices and cells and their connections shown in FIG. 1 is given for the purpose of illustration without suggesting any limitations. The communication environment 100 may include any suitable number of devices and networks adapted for implementing embodiments of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
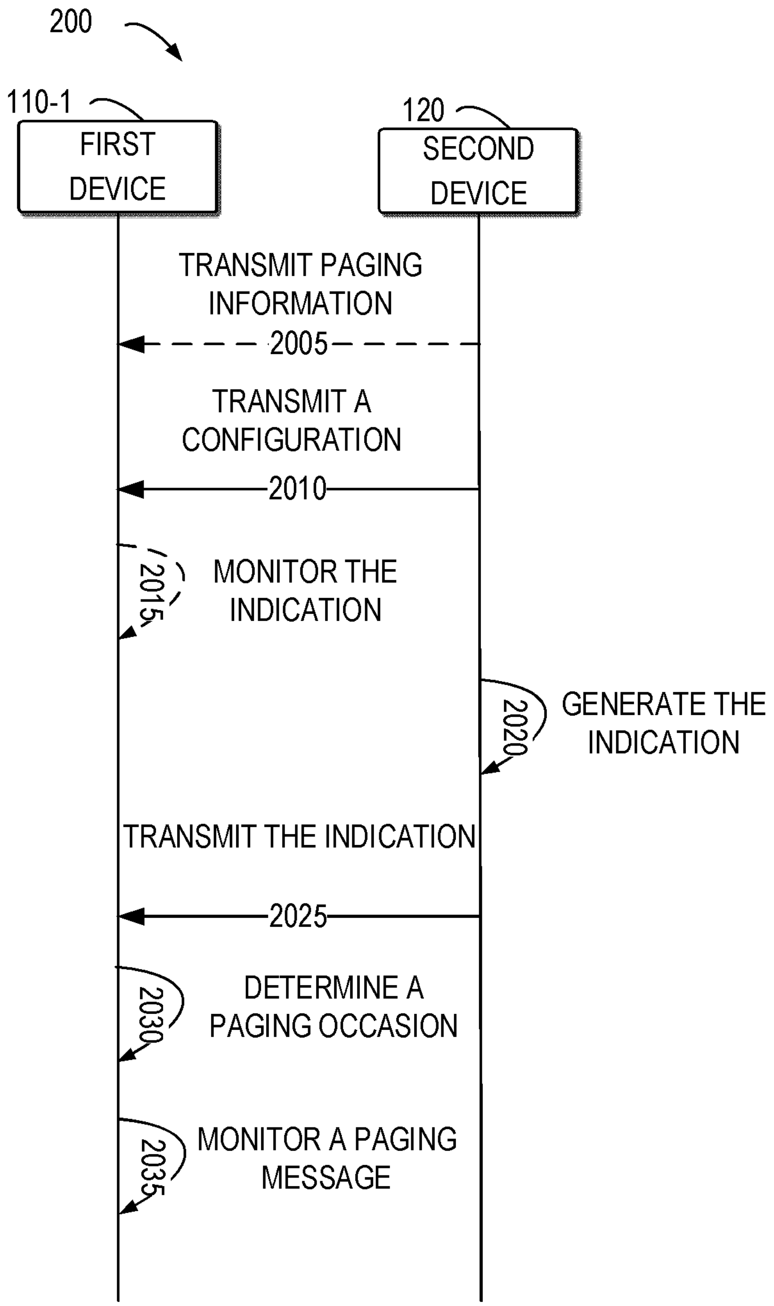
FIG. 2 illustrates a signaling flow for paging according to some example embodiments of the present disclosure.

Example embodiments of the present disclosure will be described in detail below with reference to the accompanying drawings. Reference is now made to FIG. 2, which illustrates a signaling flow 200 for paging according to example embodiments of the present disclosure. For the purpose of discussion, the signaling flow 200 will be described with reference to FIG. 1. Only for the purpose of illustrations, the signaling flow 200 may involve the first device 110-1 and the second device 120.

The second device 120 may transmit 2005 paging configuration information to the first device. In some embodiments, the paging configuration information may indicate the number of paging occasions per paging frame. For example, the number of paging occasions per paging frame may be set of 1, 2 or 4. Alternatively or in addition, the paging configuration information may also indicate a paging cycle. It should be noted that the paging configuration information may comprise any suitable information related to paging devices. In some embodiments, the paging configuration information may be transmitted in system information.

The second device 120 transmits 2010 a configuration of a paging indication to the first device 110-1. In some embodiments, the paging indication may be PF specific. For example, the PF may comprises a plurality of paging occasions for different terminal devices the paging indication may be for one or more paging occasions of a PF. In some embodiments, the paging indication may be for all paging occasions of the PF. Alternatively, the paging indication may be related to more than one PF. In some embodiments, the configuration may be transmitted in system information. Alternatively, the configuration may be transmitted in downlink control information. In other embodiments, the configuration may be transmitted in RRC signaling. In this way, the signaling overhead can be reduced and physical downlink control channel (PDCCH) capacity required for transmitting the paging indication can also be reduced.

The configuration may indicate mapping information between the paging indication and a set of paging occasions in at least one PF. It should be noted that there can be any suitable number of paging occasions in the set of paging occasions. For example, there can be one paging occasion in the et of paging occasions. Alternatively, there can be more than one paging occasion in the set of paging occasions. In some embodiments, the configuration may indicate that the paging indication may contain indication for one or more POs, for example, associated to a certain PF. Alternatively, the configuration may indicate that the paging indication may be configured with an association with one or more paging frames. In an example embodiment, the second device 120 may configure an association of the paging indication to a number of PFs within a time frame. In one further example, the paging indication may point/or indicate a specific subset of POs (e.g. a subset) within a paging frame. The number or the specific POs that can be indicated by paging indication may be configured by network.

The configuration may indicate location and scrambling information for monitoring the paging indication. In some embodiments, the configuration may indicate a time and frequency location of the paging indication. For example, if there is more than one candidate location for the paging indication, the configuration may comprise multiple time and frequency locations for monitoring the paging indication. Alternatively or in addition, the configuration may also comprise scrambling information associated with the paging indication. For the sake of conciseness, the "location information" used herein may comprise the time and frequency location(s) and scrambling information.

The first device 110-1 may monitor 2015 the paging indication based on the location information. The second device 120 generates 2020 the paging indication. It should be noted that the order of monitoring 2015 and generating 2020 shown in FIG. 2 is only an example not limitations. In some embodiments, the mapping of PF to the paging indication may be done explicitly (e.g. via configuration index such as SSB ID) or logically in the order of configuration accounting the number of PF(s) mapped to a given paging indication.

In some embodiments, the first device 110-1 may be configured to monitor the paging indication at a time offset prior to a start of the PF. Alternatively, the first device 110-1 may be configured to monitor the paging indication in a time window prior to the start of the PF. In other embodiments, the first device 110-1 may be configured to monitor synchronization signal (SS) based monitoring occasion(s) mapping to actually transmitted SSBs.

In some embodiments, the first device 110-1 may determine, based on the location information, a time offset (referred to as "a first time offset") prior to start time of the at least one paging frame from the location information. The first device 110-1 may monitor/receive the paging indication based on the first time offset. For example, the first device 110-1 may receive the paging indication with configurable time offset before the associated PF. In some embodiments, if there are multiple paging frames associated with the paging indication, the first time offset may be determined according to the start time of the first PF which is associated with the first device 110-1. Furthermore, the first time offset may be also determined according to the start time of the first PF which is not associated with the first device 110-1. The first device can determine the first PF which is not associated with the first device 110-1 based on the location information. Additionally or alternatively, a PF-specific paging indication targeting multiple POs in the PF may be received at the first time offset before the PF. Such offset may account for the paging frame offset (for example, corresponding to parameter PF_offset and parameter nAndPagingFrameOffset). In some embodiments, the first device 110-1 can be indicated which PF(s) is associated with the first device 110-1.

In some embodiments, the first device 110-1 can determine a first PDCCH monitoring occasion associated with a first paging occasion in the set of paging occasions. In some embodiments, the first paging occasion can be associated with the first device 110-1. Alternatively, the first paging occasion may not be associated with the first device 110-1, and the first device can determine the first paging occasion based on the location information. In other embodiments, the first device 110-1 may determine, based on the location information, a time offset (referred to as "a second time offset") prior to the first PDCCH monitoring occasion The first device 110-1 may monitor/receive the paging indication based on the second time offset. For example, a PF-specific paging indication targeting multiple POs in the PF can be sent at the second time offset before the first PDCCH monitoring occasion associated to the first PO in the PF. In some embodiments, the first device 110-1 can be indicated which PF(s) and/or PO(s) are associated with the first device 110-1. In addition, the first device 110-1 can also be indicated which PDCCH monitoring occasion(s) is associated with the first device 110-1.

In some embodiments, the first device 110-1 may determine, based on the location information, a time offset (referred to as "a third time offset") prior to a first paging occasion in the set of paging occasions. The first device 110-1 may monitor/receive the paging indication based on the third time offset. For example, the paging indication may be configured to be received at the third time offset (or in a window starting the third time offset) before the first PO of the associated PF. The third time offset may also be configured with respect to any PO in a PF, for example, in an example where one or more POs in PF are not associated with paging indication transmission.

Alternatively, the first device 110-1 may determine, based on the location information, a time offset between start time of a timer window and start time of the at least one paging frame. The first device 110-1 may also determine length of the time window. The first device 110-1 may monitor/receive the paging indication during the time window. For example, the paging indication may be transmitted (and/or the first device 110-1 may be configured to receive the paging indication) in the time window which contains one or more candidate time/frequency locations for the paging indication. The time window may be configured to start at a fourth time offset with respect to the first associated PF. The length of the time window may be configured by the second device 120.

In other embodiments, the first device 110-1 may determine, based on the location information, an association with a SSB. The first device 110-1 may monitor/receive the paging indication based on the SSB. For example, in some embodiments, the paging indication may be co-located with the last actually transmitted SSB that is transmitted a minimum time-offset prior to the associated PF. Alternatively, the paging indication can be multiplexed with (FDM or TDM) a SSB prior to a PF, i.e. an SSB located at a network specified offset from the start of the PF. The association may be configured between the paging indication content, or the transport block that carry the paging indication, and the corresponding PF (e.g. an association can be established between a radio network temporary identity (RNTI) that scrambles the cyclic redundancy check (CRC) of the transport block carrying the paging indication or the Search Space for the paging indication monitoring).

In some embodiments, when the SSB periodicity is long (for example, 40 ms, 80 ms, 160 ms) and multiple PFs therefore occur in between 2 SSB bursts, there can be one paging indication per PF. Then the first paging indication corresponding to the first PF within the burst is located first (time-wise) after the SSB (beam swept for example, covering 4 slots), then the second paging indication corresponding to the second PF may be placed within the next 4 slots and so forth.

In addition, the first device 110-1 may determine, based on the location information, a search space of the paging indication. The first device 110-1 may monitor/receive the paging indication in the search space. For example, the paging indication may be configured with its own specific search space configuration. The configuration may be active when the EPI monitoring window is active or the EPI monitoring is determined based on the SS configuration directly. In further example, the periodicity of the EPI search space may configured to match PF periodicity.

The second device 120 transmits 2025 the paging indication. For example, the paging indication may be transmitted in downlink control information (DCI). In one example embodiment, the location information can be transmitted to the UE by higher layers, for example, by broadcast messages. The first device 110-1 can be informed with the search space set (in case of DCI based) configuration by higher layer. SS based monitoring occasion mapping to the actually transmitted SSBs could be done similarly as for paging and/or SI messages.

In some embodiments, a PO targeted by such paging indication may be contained in the PF. Alternatively, the PO may be located in a later radio frame than the PF. This is enabled because a clear association between the paging indication content and the corresponding PF. The term "PO" used herein refers to a set of PDCCH monitoring occasions and can comprise multiple time slots. This results in a clear association between the paging indication and the POs corresponding to the PF irrespective of whether the POs are fully contained in the PF or not. This means essentially that there is a clear association between the SSB where paging indication is sent and the PF, irrespectively on whether the POs spread over multiple SSBs or several PFs fall between one SSB cycle. Alternatively, that in NR there does not exist designated physical paging frame (i.e. radio frame) within which the POs need to be contained, but the radio frame indicated by PF, to which POs are associated, is used to establish the timing and is also a logical reference for the PO.

The first device 110-1 determines 2030 a paging occasion associated with the first device 110-1. The first device 110-1 monitors 2035 a paging message in the paging occasion. Alternatively, the first device 110-1 may not monitor for the paging message until the next paging indication. In other words, the first device 110-1 may skip monitoring the paging message based on the paging indication. For example, if the paging indication does not comprise PO(s) associated with the first device 110-1, the first device 110-1 may skip monitoring the paging message. Alternatively or in addition, if the paging indication does not comprise PF(s) associated with the first device 110-1, the first device 110-1 may skip monitoring the paging message. In other embodiments, if the paging indication does not comprise a group of devices associated with the first device, the first device 110-1 may skip monitoring the paging message. The paging message can be any suitable paging messages. Embodiments of the present disclosure are not limited to this aspect. In this way, it can reduce latency and save power at the first device. Further, it also saves signaling for paging. In this way, it can save power at the first device. Further, it also saves signaling for paging.

In some embodiments, the paging indication may comprise a "Grouping bits" information element (IE), which indicates to which PO(s) and which UE subgroup(s) within a PO the paging indication is targeted for. In some embodiments, the grouping bits could be PO specific. Alternatively, the grouping bits can be common for all the POs indicated in the paging indication. These grouping bits may be assigned based at least on the total number of POs in a PF and the configuration of the paging indication. In some embodiments, if the first device 110-1 receives the paging indication in downlink control information, the first device 110-1 may determine that the downlink control information is scrambled with a radio network temporary identity which is specific to the paging occasion. The first device 110-1 may monitor the paging message in the paging occasion. In this example, the DCI carried the paging indication may be scrambled with PO (within a PF) specific RNTI which indicates which PO the paging is indicated for. The paging indication may further comprise of N-grouping bits.

In some embodiments, the first device 110-1 may obtain a bitmap from the paging indication. The bitmap may be mapped to the paging occasion based on the mapping information. For example, the grouping bits may indicate a specific PO using a bitmap. In an example, if 4 POs are configured within a PF, 4 bits may be used where each bit indicate a specific PO. For each PO, there may be zero, one, or multiple grouping bits to further sub-group UEs of that PO. It may be possible to indicate specific PO or Pos, for example, if PF contains 4 POs, only 2 may be associated with EPI. In other embodiments, the bitmap may be mapped to the at least one paging frame based on the mapping information. Alternatively or in addition, the grouping bits may indicate UE sub-group information.

In some embodiments, the bitmap may be mapped to a subset of paging occasions based on the mapping information. For example, the sub-group configuration may be in a form of a bitmap where each bit in a map indicates a specific group. For example, if 3 subgroups groups are indicated, 3 bits may be used and all subgroups can be indicated individually. In case subgroups are indicated using a bitmap, all the bits are set to a value (e.g. =0), which indicates no paging for the sub-groups implicitly indicates that in the current PO and no monitoring is required. Thus, PO indication may not be needed separately.

In other embodiments, the subgroup configuration may comprise bits where the bit combination indicates the ID (value) of the sub-group. For example, using 3 bits, 8 different group values can be indicated.

Figure 3:
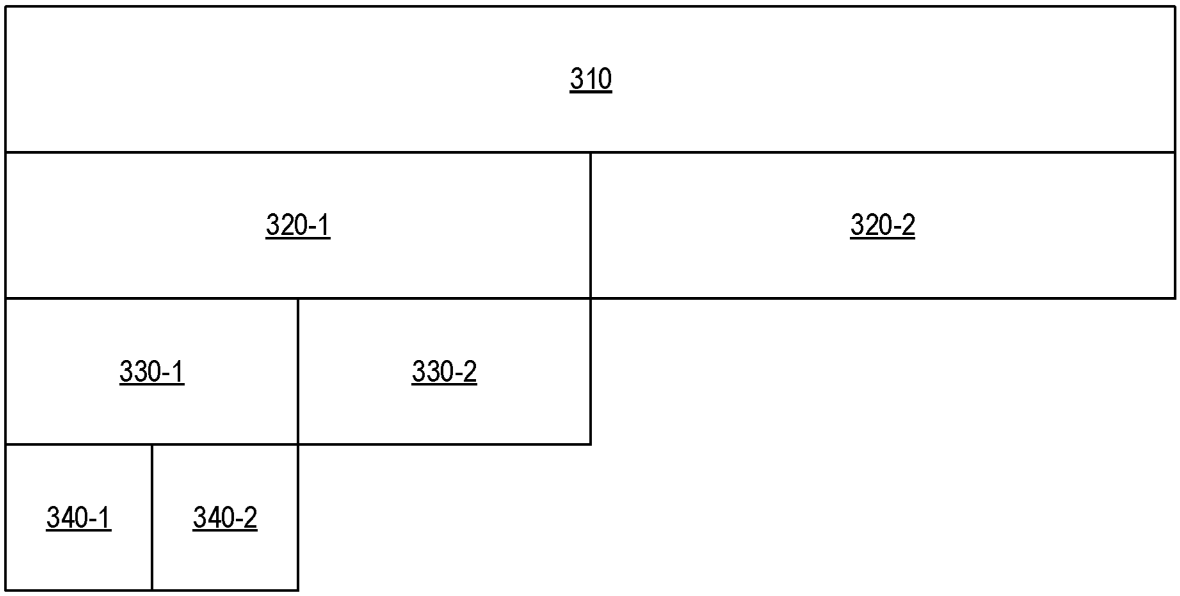
FIG. 3 illustrates a schematic diagram of different grouping layers of the paging indication according to some example embodiments of the present disclosure.

In another embodiment, grouping bits may comprise a sub-group ID where the specific grouping bits are associated to a specific PO and where a specific bit value of ID bits is reserved to indicate that no group is indicated in the PO. As shown in FIG. 3, the paging indication 310 may comprise N bits and may be associated with two paging frames 320-1 and 320-2. The paging frame 320-1 may comprise the paging occasions 330-1 and 330-2. The paging occasion 330-1 may comprise two subgroups 340-1 and 340-2. Each subgroup may comprise at least one UE. The configuration of the paging indication 310 may indicate that the paging occasion 330-1 may utilize subgroups and related grouping bits while the paging occasion 330-2 does not.

In a further embodiment, the paging indication may indicate a specific ID value of the sub-group bits which means all sub-group IDs are indicated. The paging indication may comprise any combination of above i.e. PO specific bits may be followed by the sub-group ID bits or the paging indication may comprise sub-group ID bits only. In the latter case, the PO specific indication may be in a form of RNTI or an ID value of sub-group specific bits.

In one implementation option, the number of PO bits and number of subgroup ID bits can be configured. In some embodiments where same number of subgroups per PO and all POs in a PF are targeted by the paging indication, portions of the "Grouping bits" present in the paging indication may be associated to each PO (in the set of POs in a PF) and to the UE subgroups within a given PO. In this case, the bitmap may be mapped to one or more groups of devices based on the mapping information. If the first device 110-1 belongs to any one of the one or more the groups of devices, the first device 110-1 may monitor the paging message in the paging occasion.

In an example embodiment, the "Grouping bits" IE is a bitfield size of n, where the size n is configured to the first device 110-1 via SIB/RRC as part of the EPI configuration, or is predefined for the DCI format for the paging indication. Alternatively, the size n can depend on the number of POs configured to be indicated in the paging indication. The number of UE subgroups per PO may be then a dynamic assignment that the UE derives based on the bitfield size which is represented as "n" and the number of Pos in one PF which is represented as"ns" ( ), which is provisioned to the first device 110-1 via SIB. The first device 110-1 may derive the number of UE sub-grouping bits per PO based on n and ns as follows:

$$\text{The number of UE sub-grouping bits per PO}=n\text{ (bits)/ns} \quad (1)$$

Alternatively:

$$\text{The number of UE sub-grouping bits per PO}=(n-\text{ns})/\text{ns if ns}>1; \quad (2)$$

$$\text{The number of UE sub-grouping bits per PO}=\text{ns if ns}=1$$

Alternatively:

$$\text{The number of UE sub-grouping bits per PO}=(n-\text{ns})/\text{number of paged POs} \quad (3)$$

The PO-specific bits can indicate whether the first device 110-1 should read the bitmap of that PO. Alternatively, the PO-specific bits can indicate whether the UEs which are not in the sub-group should read the PO. For each PO, there are n/ns subgroups with n/ns bits bitmap indicating for each subgroup if any UE is paged in the associated PO. For example, if all the grouping bits indicate 0, it means no UE in the PO is paged and the UEs in that subgroup do not need to monitor paging message for that PO. Alternatively, whether any UE is paged in a PO is indicated with ns bits, and whether any sub-group of UEs within each PO is paged is indicated with separate bits. Alternatively, the bits for sub-grouping are allocated only the PO(s) indicated as with UE paged. For example, if only one PO is indicated as paged, all subgrouping bits can be interpreted as for that PO. Alternatively, there can be ns bits bitmap to indicate which POs are paged and another common grouping bitmap (n-ns bits) to indicate which subgroups are paged for the indicated POs.

Examples, where only one subgroup per PO can be indicated per EPI:

If n is 3 (or 4) and ns is 1 (i.e. 1 PO per PF), the number of UE subgroups bits per PO is 3 (or 4) bits and the number of UE subgroups per PO is 8 (or 16). If n is 6 and ns is 2 (i.e. 2 PO per PF), the number of UE subgroups bits per PO is 3 bits and the number of UE subgroups per PO is 8. If n is 12 (or 16) and ns is 4 (i.e. 4 PO per PF), the number of UE subgroups bits per PO is 3 (or 4) bits and the number of UE subgroups per PO is 8 (or 16).

Examples, where any number of subgroups per PO can be indicated per EPI:

If n is 16 bits and ns is 1 (i.e. 1 PO per PF), the number of UE subgroups bits per PO is 16 bits since no bit needed for PO indication. If n is 16 bits and ns is 2 (i.e. 2 PO per PF), the number of UE subgroups bits per PO is (16−2)/2=7 bits since one bit is needed for PO indication which can support 7 sub-groups per PO. Alternatively, the PO is indicated implicitly and the number of UE subgroups bits per PO is (16)/2=8 bits. If n is 16 bits and ns is 4 (i.e. 4 PO per PF), the number of UE subgroups bits per PO is (16-4)/4=3 bits since one bit is needed for PO indication which can support 3 sub-groups per PO. Alternatively, the PO is indicated implicitly and the number of UE subgroups bits per PO is (16)/4=4 bits. Alternatively, instead of having separate bitmap for each PO, the sub-grouping bitmap could be shared for all the POs paged. For example, 2 bits to indicate which of the 2 POs are paged and 14 bits to indicate which of the 14 sub-groups within the paged POs are paged.

Figure 4A:
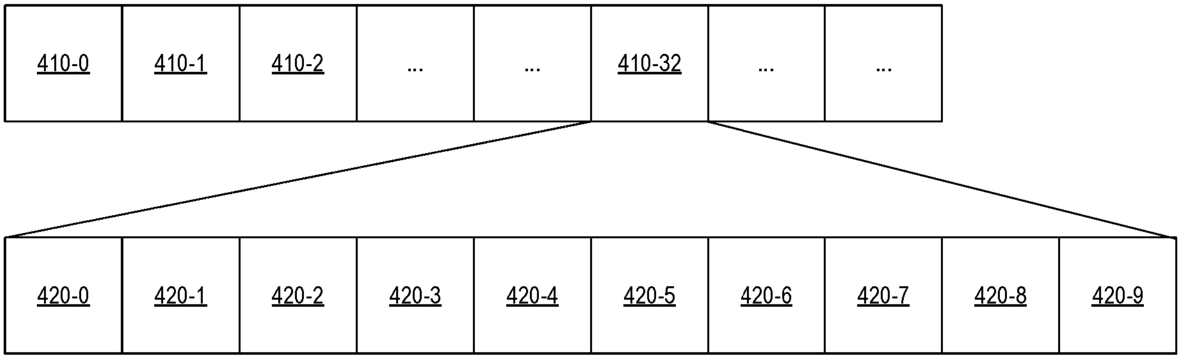
FIGS. 4A and 4B illustrate schematic diagrams of grouping bits formats according to some example embodiments of the present disclosure.
Figure 4B:
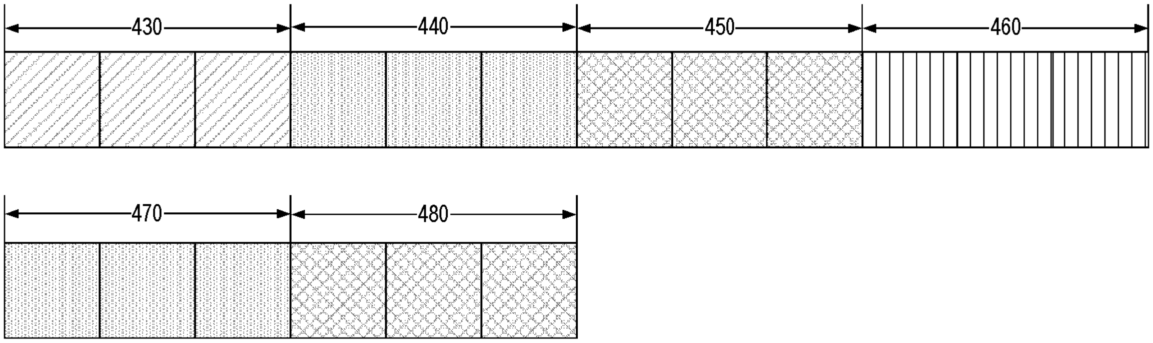

In some embodiments where same number of subgroups per PO but not all POs in a PF is targeted by the paging indication, the paging indication may be assumed to indicate paging and subgrouping for all POs in a PF. However, the network may have reasons for the paging indication to target only a subset of POs in a PF. Thus, the grouping bits in the paging indication should allow to flexibly pointing to the subset of POs that are targeted. The number and the indices of the targeted POs in the paging indication may be provided as part of the paging indication configuration. For this case, the parameter ns (the number of Pos in one PF) may be replaced by configured target subset of POs in a PF. As shown in FIG. 4A, the paging cycle may be 1.28 sec and comprise the radio frames 410-0, 410-1, 410-2, . . . , 410-32 and so on. Only for the purpose of illustrations, the radio frame 410-32 can be regarded as the paging frame. The radio frame 410-32 may comprise subframes/slots 420-0, 420-1, 420-2, 420-3, 420-4, 420-5, 420-6, 420-7, 420-8 and 420-9. The subframe 420-0 may be the first paging occasion where a first subset of UEs shares the first paging occasion. The subframe 420-3 may be the second paging occasion where a second subset of UEs shares the second paging occasion. The subframe 420-6 may be the third paging occasion where a third subset of UEs shares the third paging occasion. The subframe 420-9 may be the fourth paging occasion where a fourth subset of UEs shares the fourth paging occasion. As shown in FIG. 4B, in a situation where each PO is addressed by the paging indication, the subgroup bits 430 may be associated to the first PO, the subgroup bits 440 may be associated to the second PO, the subgroup bits 450 may be associated to the third PO, and the subgroup bits 460 may be associated to the fourth PO. As shown in FIG. 4B, in another situation where only two POs in the PF are addressed, the subgrouping bits 470 may be associated with the first PO and the subgrouping bits 48 may be associated with the second PO.

In some embodiments where different number of subgroups per PO and all/subset of POs in a PF are targeted by the paging indication, the first device 110-1 can assign (n/ns) grouping bits to each PO except for the last PO, to which the first device 110-1 assigns the remaining bits.

In some embodiments, the order of the POs within the paging indication may not be maintained. In this example, the second device 120 may indicate a different order of the POs in the grouping bits as part of the configuration of the paging indication.

Figure 5:
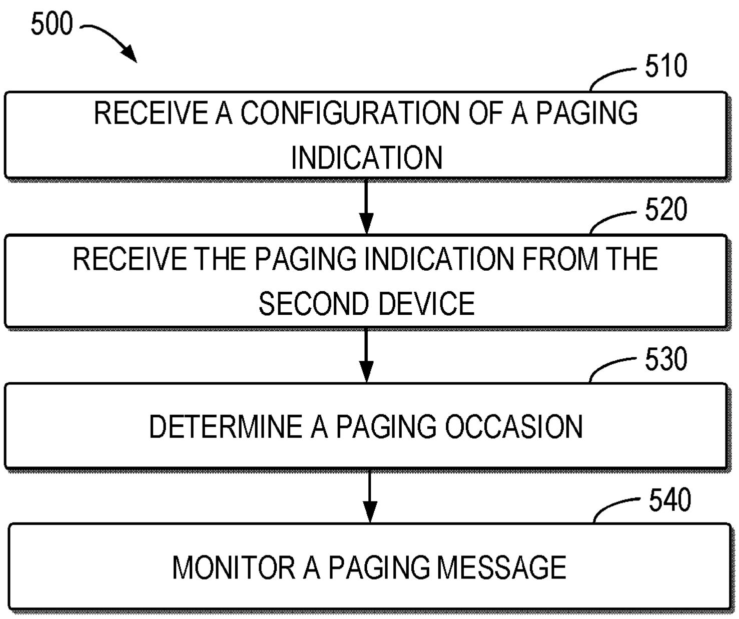
FIG. 5 illustrates a flowchart of a method implemented at a first apparatus according to some example embodiments of the present disclosure.

FIG. 5 shows a flowchart of an example method 500 implemented at a first device 110 in accordance with some example embodiments of the present disclosure. For the purpose of discussion, the method 500 will be described from the perspective of the first device 110.

At block 510, the first device 110-1 receives a configuration of a paging indication from the second device 120. The configuration indicates location information for monitoring the paging indication, and mapping information between the paging indication and a set of paging occasions in at least one paging frame.

At block 520, the first device 110-1 receives the paging indication from the second device based on the location information. In some embodiments, the first device 110-1 may determine, from the location information, a first time offset prior to start time of the at least one paging frame. The first device 110-1 may receive the paging indication based on the first time offset.

In other embodiments, the first device 110-1 may determine, from the location information, a second time offset prior to a first physical downlink control channel, PDCCH, monitoring occasion associated with a first paging occasion in the set of paging occasions. The first device 110-1 may receive the paging indication based on the second time offset.

In some embodiments, the first device 110-1 may determine, from the location information, a third time offset prior to a first paging occasion in the set of paging occasions. The first device 110-1 may receive the paging indication based on the third time offset.

In an example embodiment, the first device 110-1 may determine, from the location information, a fourth time offset between start time of a time window and start time of the at least one paging frame and length of the time window. The first device 110-1 may receive the paging indication during the time window.

In a yet embodiment, the first device 110-1 may determine, from the location information, an association with a synchronization signal block. The first device 110-1 may receive the paging indication based on the synchronization signal block.

In another embodiment, the first device 110-1 may determine, from the location information, a search space of the paging indication. The first device 110-1 may receive the paging indication in the search space.

At block 530, the first device 110-1 determines, based on the mapping information, a paging occasion which is associated with the first device from the set of paging occasions.

At block 540, the first device 110-1 monitors a paging message in the determined paging occasion associated with the first device. In some embodiments, the first device 110-1 may determine that downlink control information is scrambled with a radio network temporary identity which is specific to the paging occasion and monitor the paging message in the paging occasion.

In other embodiments, the first device 110-1 may obtain a bitmap from the paging indication and map the bitmap to the paging occasion based on the mapping information. The first device 110-1 may monitor the paging message in the paging occasion.

In other embodiments, the first device 110-1 may obtain a bitmap from the paging indication and map the bitmap to the at least one paging frame based on the mapping information. The first device 110-1 may monitor the paging message in the at least one paging frame.

In another embodiment, the first device 110-1 may obtain a bitmap from the paging indication and map the bitmap to a subset of paging occasions based on the mapping information. If the paging occasion is in the subset of paging occasions, the first device 110-1 may monitor the paging message in the paging occasion.

In an example embodiment, the first device 110-1 may obtain a bitmap from the paging indication and map the bitmap to a group of devices based on the mapping information. If the first device belongs to the group of devices, the first device 110-1 may monitor the paging message in the paging occasion.

In some example embodiments, a first apparatus capable of performing any of the method 500 (for example, the first device 110) may comprise means for performing the respective operations of the method 300. The means may be implemented in any suitable form. For example, the means may be implemented in a circuitry or software module.

The first apparatus may be implemented as or included in the first device 110. In some example embodiments, the means may comprise at least one processor and at least one memory including computer program code. The at least one memory and computer program code are configured to, with the at least one processor, cause performance of the apparatus.

In some embodiments, the apparatus comprises means for receiving, at a first device and from a second device, a configuration of a paging indication, the configuration indicating: location information for monitoring the paging indication, and mapping information between the paging indication and a set of paging occasions in at least one paging frame; means for receiving the paging indication from the second device based on the location information; means for determining a paging occasion which is associated with the first device; and means for monitoring a paging message in the determined paging occasion associated with the first device.

In some embodiments, the means for receiving the paging indication comprises: means for determining, from the location information, a first time offset prior to start time of the at least one paging frame; and means for receiving the paging indication based on the first time offset.

In some embodiments, the means for receiving the paging indication comprises: means for determining, from the location information, a second time offset prior to a first physical downlink control channel, PDCCH, monitoring occasion associated with a first paging occasion in the set of paging occasions; and means for receiving the paging indication based on the second time offset.

In some embodiments, the means for receiving the paging indication comprises: means for determining, from the location information, a third time offset prior to a first paging occasion in the set of paging occasions; and means for receiving the paging indication based on the third time offset.

In some embodiments, the means for receiving the paging indication comprises: means for determining, from the location information, a fourth time offset between start time of a time window and start time of the at least one paging frame and length of the time window; and means for receiving the paging indication during the time window.

In some embodiments, the means for receiving the paging indication comprises means for determining, from the location information, an association with a synchronization signal block; and means for receiving the paging indication based on the synchronization signal block.

In some embodiments, the means for receiving the paging indication comprises: means for determining, from the location information, a search space of the paging indication; and means for receiving the paging indication in the search space.

In some embodiments, the configuration is received in system information or downlink control information.

In some embodiments, the means for receiving the paging indication comprises: means for receiving the paging indication in downlink control information; and the means for monitoring the paging message in the paging occasion comprises: means for determining that downlink control information is scrambled with a radio network temporary identity which is specific to the paging occasion; and means for monitoring the paging message in the paging occasion.

In some embodiments, the means for monitoring the paging message in the paging occasion comprises: means for obtaining a bitmap from the paging indication; means for mapping the bitmap to the paging occasion based on the mapping information; and means for monitoring the paging message in the paging occasion.

In some embodiments, the means for monitoring the paging message in the paging occasion comprises: means for obtaining a bitmap from the paging indication; means for mapping the bitmap to the at least one paging frame based on the mapping information; and means for monitoring the paging message in the at least one paging frame.

In some embodiments, the means for monitoring the paging message in the paging occasion comprises: means for obtaining a bitmap from the paging indication; means for mapping the bitmap to a subset of paging occasions based on the mapping information; and means for in accordance with a determination that the paging occasion is in the subset of paging occasions, monitoring the paging message in the paging occasion.

In some embodiments, the means for monitoring the paging message in the paging occasion comprises: means for obtaining a bitmap from the paging indication; means for mapping the bitmap to a group of devices based on the mapping information; and means for in accordance with a determination that the first device belongs to the group of devices, monitoring the paging message in the paging occasion.

In some embodiments, the apparatus comprise means for causing monitoring the paging message to be skipped based on the paging indication.

Figure 6:
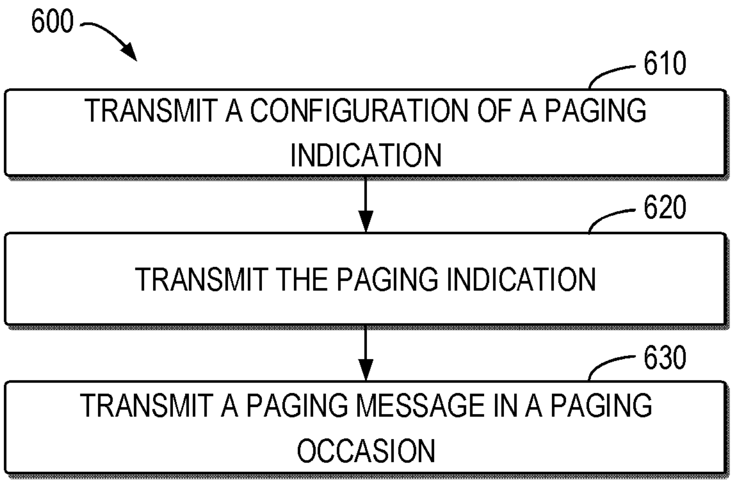
FIG. 6 illustrates a flowchart of a method implemented at a second apparatus according to some other example embodiments of the present disclosure.

FIG. 6 shows a flowchart of an example method 600 implemented at a second device 120 in accordance with some example embodiments of the present disclosure. For the purpose of discussion, the method 600 will be described from the perspective of the second device 120.

At block 610, the second device 120 transmits a configuration of a paging indication to the first device 110-1. At block 620, the second device 120 transmits the paging indication to the first device based on the location information. The configuration indicates: location information for monitoring the paging indication, and mapping information between the paging indication and a set of paging occasions in at least one paging frame.

In some embodiments, the second device 120 may transmit the configuration comprising the location information indicating a first time offset prior to start time of the at least one paging frame. The second device 120 may transmit the paging indication based on the first time offset.

In an example embodiment, the second device 120 may transmit the configuration comprising the information indicating a second time offset prior to a first physical downlink control channel, PDCCH, monitoring occasion associated with a first paging occasion in the set of paging occasions. The second device 120 may transmit the paging indication based on the second time offset.

In another example embodiment, the second device 120 may transmit the configuration comprising the information indicating a third time offset prior to a first paging occasion in the set of paging occasions. The second device 120 may transmit the paging indication based on the third time offset.

In a yet example embodiment, the second device 120 may transmit the configuration comprising the information indicating a fourth time offset between start time of a time window and start time of the at least one paging frame and length of the time window. The second device 120 may transmit the paging indication during the time window.

In some embodiments, the second device 120 may transmit the configuration comprising the information indicating an association with a synchronization signal block. The second device 120 may transmit the paging indication based on the synchronization signal block.

In another embodiment, the second device 120 may transmit the configuration comprising the information indicating a search space of the paging indicating. The second device 120 may transmit the paging indication in the search space. The configuration may be transmitted in system information or downlink control information.

At block 630, the second device 120 transmits, to the first device 110-1, a paging message in a paging occasion associated with the first device in the set of paging occasions based on the paging indication. In some embodiments, the second device 120 may transmit the paging indication in downlink control information which is scrambled with a radio network temporary identity which is specific to the paging occasion. The second device 120 may transmit the paging message in the paging occasion.

In some embodiments, the second device 120 may generate the paging indication comprising a bitmap which is to be mapped to the paging occasion based on the mapping information. The second device 120 may transmit the paging message in the paging occasion.

In other embodiments, the second device 120 may generate the paging indication comprising a bitmap which is to be mapped to the at least one paging frame based on the mapping information. The second device 120 may transmit the paging message in the paging frame.

In some embodiments, the second device 120 may generate the paging indication comprising a bitmap which is to be mapped to a subset of paging occasions based on the mapping information. If the paging occasion is in the subset of paging occasions, the second device 120 may transmit the paging message the paging message in the paging occasion.

In other embodiments, the second device 120 may generate the indication paging comprising a bitmap which is mapped to a group of devices for monitoring the paging message based on the mapping information.

In some example embodiments, a second first apparatus capable of performing any of the method 600 (for example, the second device 120) may comprise means for performing the respective operations of the method 600. The means may be implemented in any suitable form. For example, the means may be implemented in a circuitry or software module. The first apparatus may be implemented as or included in the second device 120. In some example embodiments, the means may comprise at least one processor and at least one memory including computer program code. The at least one memory and computer program code are configured to, with the at least one processor, cause performance of the apparatus.

In some embodiments, the apparatus comprises means for transmitting, at a second device and to a first device, a configuration of a paging indication, the configuration indicating location information for monitoring the paging indication, and mapping information between the paging indication and a set of paging occasions in at least one paging frame; means for transmitting the paging indication to the first device based on the location information; and means for transmitting, to the first device, a paging message in a paging occasion associated with the first device in the set of paging occasions based on the paging indication.

In some embodiments, the means for transmitting the configuration comprises: means for transmitting the configuration comprising the location information indicating a first time offset prior to start time of the at least one paging frame; and the means for transmitting the paging indication comprises means for transmitting the paging indication based on the first time offset.

In some embodiments, the means for transmitting the configuration comprises: means for transmitting the configuration comprising the information indicating a second time offset prior to a first physical downlink control channel, PDCCH, monitoring occasion associated with a first paging occasion in the set of paging occasions; and the means for transmitting the paging indication comprises: means for transmitting the paging indication based on the second time offset.

In some embodiments, the means for transmitting the configuration comprises: means for transmitting the configuration comprising the information indicating a third time offset prior to a first paging occasion in the set of paging occasions; and the means for transmitting the paging indication comprises: means for transmitting the paging indication based on the third time offset.

In some embodiments, the means for transmitting the configuration comprises: means for transmitting the configuration comprising the information indicating a fourth time offset between start time of a time window and start time of the at least one paging frame and length of the time window; and the means for transmitting the paging indication comprises: means for transmitting the paging indication during the time window.

In some embodiments, the means for wherein transmitting the configuration comprises: means for transmitting the configuration comprising the information indicating an association with a synchronization signal block; and the means for transmitting the paging indication comprises: means for transmitting the paging indication based on the synchronization signal block.

In some embodiments, the means for transmitting the configuration comprises: means for transmitting the configuration comprising the information indicating a search space of the paging indicating; and the means for transmitting the paging indication comprises: means for transmitting the paging indication in the search space.

In some embodiments, the configuration is transmitted in system information or downlink control information.

In some embodiments, the means for transmitting the paging indication comprises: means for transmitting the paging indication in downlink control information which is scrambled with a radio network temporary identity which is specific to the paging occasion; and the means for transmitting the paging message in the paging occasion comprises means for transmitting the paging message in the paging occasion.

In some embodiments, the apparatus further comprises means for generating the paging indication comprising a bitmap which is to be mapped to the paging occasion based on the mapping information; and the means for transmitting the paging message in the paging occasion comprises means for transmitting the paging message in the paging occasion.

In some embodiments, the apparatus further comprises means for generating the indication paging comprising a bitmap which is to be mapped to the at least one paging frame based on the mapping information; and the means for transmitting the paging message in the at least one paging frame comprises means for transmitting the paging message in the paging frame.

In some embodiments, the apparatus further comprises means for generating the indication paging comprising a bitmap which is to be mapped to a subset of paging occasions based on the mapping information; and the means for transmitting the paging message in the paging occasion comprises: means for in accordance with a determination that thee paging occasion is in the subset of paging occasions, transmitting the paging message in the paging occasion.

In some embodiments, the apparatus further comprises means for generating the indication paging comprising a bitmap which is mapped to a group of devices for monitoring the paging message based on the mapping information.

Figure 7:
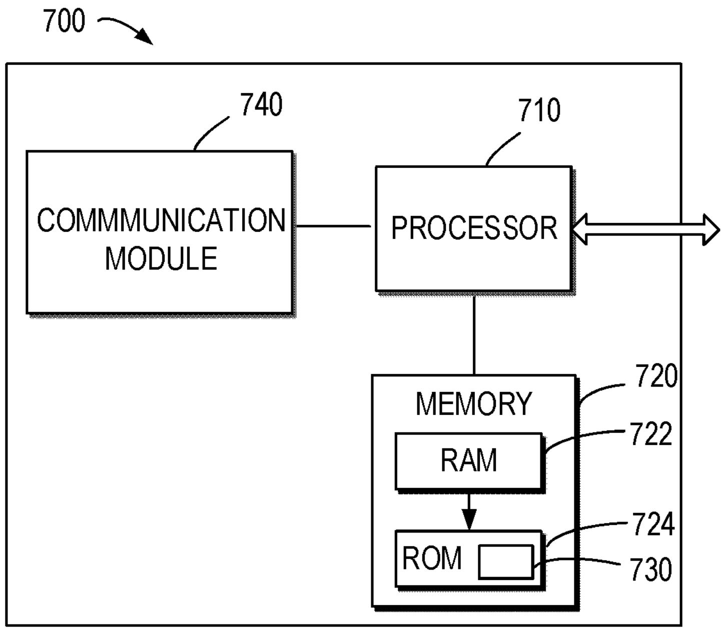
FIG. 7 illustrates a simplified block diagram of an apparatus that is suitable for implementing example embodiments of the present disclosure.

FIG. 7 is a simplified block diagram of a device 700 that is suitable for implementing example embodiments of the present disclosure. The device 700 may be provided to implement a communication device, for example, the first device 110 or the second device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the memory, e.g., ROM 724. The processor 710 may perform any suitable actions and processing by loading the program 730 into the RAM 722.

Example embodiments of the present disclosure may be implemented by means of the program 730 so that the device 700 may perform any process of the disclosure as discussed with reference to FIGS. 2 to 6. The example embodiments of the present disclosure may also be implemented by hardware or by a combination of software and hardware.

Figure 8:
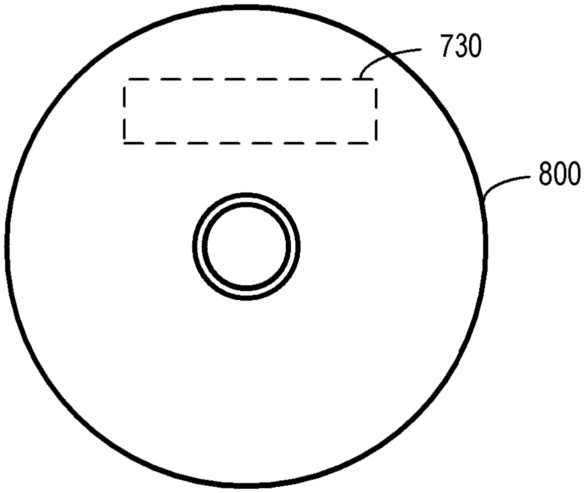
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and other magnetic storage and/or optical storage. FIG. 8 shows an example of the computer readable medium 800 in form of an optical storage disk. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method, comprising:

receiving, at a first device and from a second device, a configuration of a paging indication, the configuration indicating:

location information for monitoring the paging indication, and mapping information between the paging indication and a set of paging occasions in at least one paging frame;

determining, from the location information, a time offset prior to a start time of the at least one paging frame associated with the first device;

receiving the paging indication from the second device based on the determined time offset;

obtaining a bitmap from the paging indication;

based on the mapping information, mapping the bitmap to a paging occasion associated with the first device from the set of paging occasions; and based on the bitmap, monitoring a paging message in the paging occasion associated with the first device.

2. The method of claim 1, wherein receiving the paging indication comprises:

determining, from the location information, a search space of the paging indication; and receiving the paging indication in the search space.

3. The method of claim 1, wherein the configuration is received in at least one of system information, downlink control information or radio resource control signaling.

4. The method of claim 1, further comprising:

mapping the bitmap to at least one group of devices based on the mapping information; and in accordance with a determination that the first device belongs to one of the at least one group of devices, monitoring the paging message in the paging occasion.

5. A method, comprising:

transmitting, at a second device and to a first device, a configuration of a paging indication, the configuration indicating:

location information for monitoring the paging indication, the location information indicating a time offset prior to a start time of at least one paging frame, and mapping information between the paging indication and a set of paging occasions in the at least one paging frame;

generating the paging indication comprising a bitmap which is to be mapped to a paging occasion associated with the first device from the set of paging occasions;

transmitting the paging indication to the first device based on the time offset; and transmitting, to the first device, a paging message in the paging occasion associated with the first device in the set of paging occasions based on the bitmap.

6. The method of claim 5, wherein transmitting the configuration comprises:

transmitting the configuration comprising the information indicating a search space of the paging indication; and wherein transmitting the paging indication comprises:

transmitting the paging indication in the search space.

7. The method of claim 5, wherein the configuration is transmitted in system information or downlink control information.

8. The method of claim 5, wherein the bitmap is mapped to a group of devices for monitoring the paging message based on the mapping information.

9. A second device comprising:

at least one processor; and at least one memory including computer program code;

the at least one memory and the computer program code are configured to, with the at least one processor, cause the second device to perform the method according to claim 5.

10. An apparatus, comprising:

at least one processor; and at least one memory storing instructions that, when executed by the at least one processor, cause the apparatus at least to perform:

receiving, from a second device, a configuration of a paging indication, the configuration indicating:

location information for monitoring the paging indication, and mapping information between the paging indication and a set of paging occasions in at least one paging frame;

determining, from the location information, a time offset prior to a start time of the at least one paging frame associated with the apparatus;

receiving the paging indication from the second device based on the determined time offset;

obtaining a bitmap from the paging indication;

based on the mapping information, mapping the bitmap to a paging occasion associated with the apparatus from the set of paging occasions; and based on the bitmap, monitoring a paging message in the paging occasion associated with the apparatus.

11. The apparatus of claim 10, wherein receiving the paging indication comprises:

determining, from the location information, a search space of the paging indication; and receiving the paging indication in the search space.

12. The apparatus of claim 10, wherein the configuration is received in at least one of system information, downlink control information or radio resource control signaling.

13. The apparatus of claim 10, wherein the apparatus is further caused to perform:

mapping the bitmap to at least one group of devices based on the mapping information; and in accordance with a determination that the apparatus belongs to one of the at least one group of devices, monitoring the paging message in the paging occasion.

* * * * *